July 4, 1967 H. LINDEMANN 3,328,994
METHOD AND APPARATUS FOR EXTRUDING HEAT-CONDUCTIVE MATERIALS
Filed March 17, 1965 3 Sheets-Sheet 1

INVENTOR
Hans Lindemann
By Dicke & Craig
ATTORNEYS

July 4, 1967     H. LINDEMANN     3,328,994
METHOD AND APPARATUS FOR EXTRUDING HEAT-CONDUCTIVE MATERIALS
Filed March 17, 1965     3 Sheets-Sheet 2

INVENTOR
Hans Lindemann
By Dicke & Craig
ATTORNEYS

July 4, 1967  H. LINDEMANN  3,328,994
METHOD AND APPARATUS FOR EXTRUDING HEAT-CONDUCTIVE MATERIALS
Filed March 17, 1965  3 Sheets-Sheet 3

INVENTOR
Hans Lindemann
By Dicke & Craig
ATTORNEYS 3,328,994
METHOD AND APPARATUS FOR EXTRUDING HEAT-CONDUCTIVE MATERIALS
Hans Lindemann, Lindenstrasse 39,
Grossdornberg, Germany
Filed Mar. 17, 1965, Ser. No. 440,509
Claims priority, application Germany, Mar. 17, 1964,
L 47,311
8 Claims. (Cl. 72—253)

This present invention relates to a method of extruding materials of a high heat conductivity, such as metals, for producing solid or tubular products of any desired cross-sectional shape, such as wire, rods, bars, seamless pipe, tubular elements, or the like. More particularly, the invention relates to improvements in the method and apparatus as disclosed in my previous U.S. Patent No. 3,103,713, in which—contrary to the conventional extrusion methods—the material is fed in a liquid condition into a container which may be heated and cooled and is provided with an extrusion nozzle, and in which the material may be subjected to a pressure higher than that which is required for extruding the material through the mentioned nozzle. According to this prior method of mine, the outlet nozzle of the container is not opened until the material in the container is cooled off sufficiently so as to have a cerain degree of viscosity. This has the effect that the material will solidify suddenly as soon as it emerges from the outlet nozzle and therefore does not have to be cooled during a long distance of its travel.

It is an object of the present invention to improve the above-mentioned method in a manner so as to permit the extruded products to be produced more economically than it was possible with the method according to my previous patent as referred to above. Another important object of the invention consists in carrying out the new method by means of an apparatus which is considerably smaller and less expensive than the apparatus which was required for carrying out the mentioned previous extrusion method.

Whereas according to my previous method it was necessary to provide a relatively large container for holding the liquid metal and to exert upon this metal a very high pressure so as to effect a strong cooling action upon the material as the result of the sudden drop in pressure when the material emerges from the extrusion nozzle at the outlet of this container, the present invention provides that the extruded material be cooled directly by suitable cooling means rather than by the drop of pressure. According to the invention the effectiveness of these cooling means is considerably increased by providing a relatively small chamber at the inlet side of the extrusion nozzle in place of the large container which was previously required for holding the liquid metal. This chamber is therefore capable of holding only a small volume of molten metal and it is continuously supplied with liquid metal only at such a rate that, due to the heat conductivity of the metal, the cooling effect of the cooling means around and/or subsequent to the extrusion nozzle will be transmitted to that part of the metal which is located within the chamber adjacent to the inlet side of the nozzle. Consequently, while the metal is being extruded through the nozzle, it already starts to solidify within the chamber at a certain distance from the extrusion nozzle and it will already be in a solid, although malleable condition when it reaches the narrowest part of the nozzle during the extrusion movement. Due to the new concept of the invention, it is therefore now no longer necessary to provide a large container, but only a relatively small chamber for holding the liquid metal prior to its passage through the extrusion nozzle. Furthermore, for sufficiently cooling the material so that it will be fully solidified when emerging from the extrusion nozzle, it is now only necessary to provide relatively simple cooling means, and there is no longer any need for exerting upon the liquid material within the container or chamber such a strong pressure as previously required for attaining the desired cooling effect as the result of the drop in pressure which occurs when the material emerges from the extrusion nozzle. Since the cooling action is now attained by the direct cooling action of the cooling means in combination with the small volume of molten metal within the chamber, it is now only necessary to exert such relatively low pressure upon the metal within this chamber that the solidified but malleable material will be forced at a certain rate of speed through the extrusion nozzle.

For producing this extrusion pressure, various means may be provided. Thus, for example, the liquid metal may be supplied to the chamber preceding the extrusion nozzle by the action of a pressure gas or by a reciprocating pump which is capable of withstanding the high temperatures of the liquid metal or by producing the required pressure within the chamber by the provision of suitable means for effecting arc explosions in this chamber. The amount of pressure required for the extrusion process may be further reduced if a traction is applied upon the part of the material which is already extruded from the nozzle.

Since the liquid material is now cooled by a direct cooling action thereon as it passes through and emerges from the relatively short extrusion nozzle so that the cooled emerging part abstracts heat from the liquid material preceding the nozzle, and since the rate of extrusion of the material from the nozzle depends upon the heat conductivity of the particular material and upon the temperature gradient between the cooled part and the liquid part of the material, the method according to the invention is especially suitable for such materials which have a high heat conductivity and may be quenched when emerging from the short nozzle without danger that the structure of the material might thereby be harmed. Since a considerable heat flow occurs within the area of the nozzle and this heat flow may be controlled, it is possible to provide the extruded products with excellent physical properties and especially with a good tensile strength. The method according to the invention may be applied not only for extruding solid products of any desired cross-sectional shape, but also for producing seamless tubular elements of a relatively small wall thickness and of a relatively large diameter, for example, of 5 m., and of a great length, for example, of 20 m. If the tubular elements are to be made of stainless steel, for example, for space-bound vehicles, in which a sudden quenching of the material is very desirable for improving its physical properties, the further advantage will be attained that such large pipes may even be provided with double walls and reinforcing ribs and be produced entirely without seams. In proportion to their weight, such double-walled pipes possess an extremely high strength.

Especially for producing pipes of relatively large diameters, it is also possible to carry out the method according to the invention by extruding the material in the upward direction by providing the exrusion nozzle above the chamber containing the liquid material rather than underneath this chamber.

The features and advantages of the present invention will become more clearly apparent from the following detailed description thereof which is to be read with reference to the accompanying drawings, in which—

FIGURE 3 shows a cross section of a double-walled pipe which may be produced according to the invention; while

Figure 1:
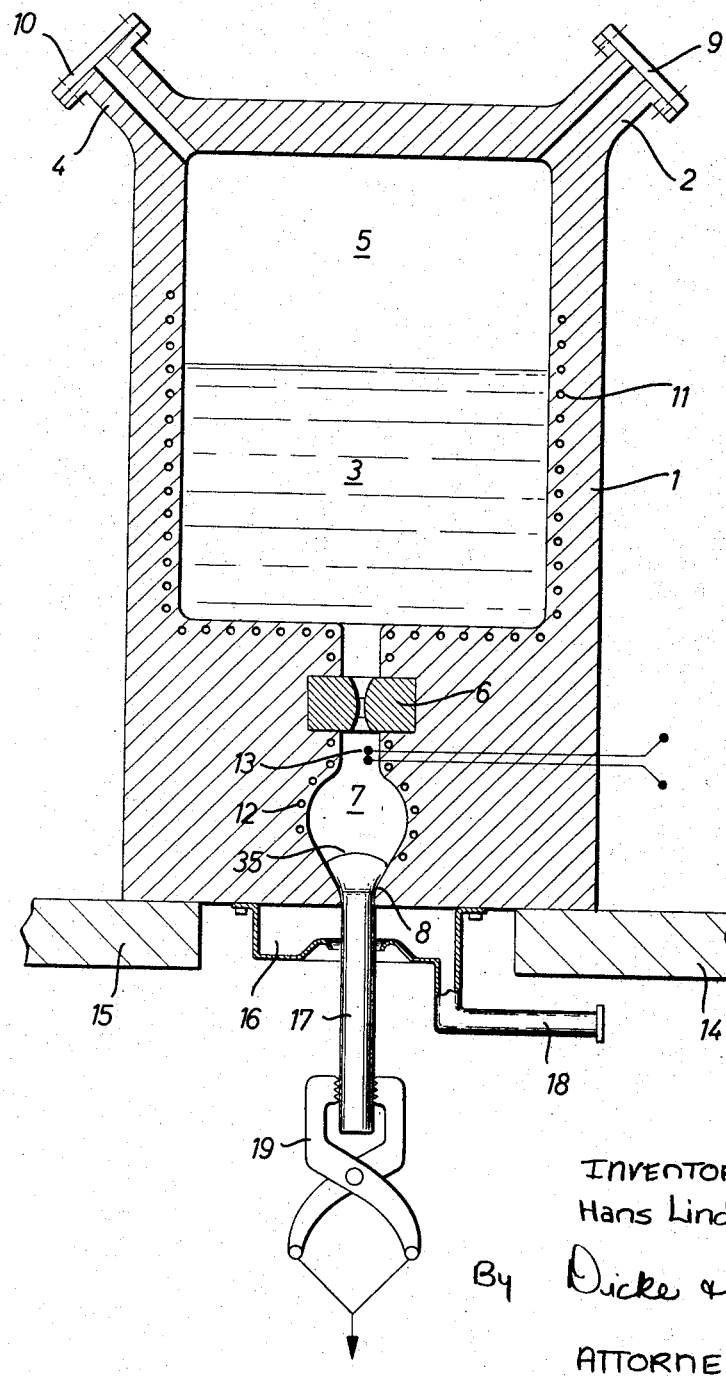
FIGURE 1 shows a vertical section of an apparatus according to the invention including a container which is adapted to be heated and cooled and also contains a small chamber from which the material is extruded through an extrusion nozzle.

As illustrated in FIGURE 1 of the drawings, the apparatus according to the invention comprises a container 1 which is capable of withstanding high pressures. This container is provided at its upper end with a metal inlet 2 for filling it partly with the liquid metal 3 which is to be extruded, and with a gas inlet 4 for filling the part of the container above the liquid metal 3 with a suitable gas 5 under pressure. The bottom of the container 1 is further provided with a reducing nozzle 6 which is connected to the bottom opening of the container, with a chamber 7 underneath and connected to the reducing nozzle 6, and with an extrusion nozzle 8 at the lower end of the chamber. 7 The two inlets 2 and 4 are adapted to be opened and closed and may be connected by flanges 9 and 10 to a supply of liquid metal and to a supply of inert gas under pressure, respectively. At the inside of its walls, the container 1 is provided with separate heating coils 11 and 12 for heating the metal 3 within the container itself and for heating up the chamber 7 underneath the reducing nozzle 6 or for maintaining this chamber at certain temperature. Of course, in addition to or in place of the heating coils 11 and 12, it is also possible to provide other conventional heating means for heating up the molten metal in the container 1 and for maintaining the metal at the desired temperature in the chamber 7. Between the reducing nozzle 6 and the chamber 7, a suitable device 13 is provided for producing an arc-explosion pressure. As indicated in FIGURE 1, these means may consist, for example, of spaced electrodes which are connected to an arc generator.

Underneath the outlet nozzle 7 of the pressure container 1 and between a pair of brackets or other supporting elements 14 and 15 on which the container is mounted, a suitable cooling device 16 is provided for cooling the extruded material 17. The cooling medium which may be either a gas or a liquid is supplied to the cooling device 16 through a conduit 18 and surrounds the material 17 as it emerges from the extrusion nozzle 7 so that the extruded material will be cooled very effectively. Of course, if desired, the cooling conduit or an additional conduit may also extend around the nozzle 8 within the bottom of the container 1.

The reducing nozzle 6 is made of such dimensions that in accordance with the pressure of the pressure gas 5 and the extent of the cooling action produced by the cooling device 16 only so much metal enters into the chamber 7 that the area of crystallization of the metal will be located within the wider upper part of the extrusion nozzle 8 and the solidified metal will therefore be compressed while it is forced through the nozzle. If by the operation of the explosion-pressure device 13 a pulsating explosion pressure is produced in the chamber 7, the pressure of the pressure gas 5 itself may be relatively low since it only has to be strong enough to refill the chamber 7 with liquid material after each explosion. The pressure which is required for extruding the material 17 is therefore produced by the pulsating explosions. Since the cross-sectional size of the reducing nozzle 6 only amounts to a fraction of the cross-sectional size of the outlet nozzle 8, the back pressure within the reducing nozzle 6 will only be relatively low. The solid extracted material 17 may also be drawn out by means of a suitable drawgear 19 which permits the extrusion pressure to be reduced in accordance with the strength of this traction.

Although the metal inlet 2 is preferably opened and closed periodically to fill the pressure container 1 to a certain level with molten metal 3, it is advisable to connect the gas inlet 4 continuously to a gas generator so that the pressure of the gas 5 will always be constant.

Figure 2:
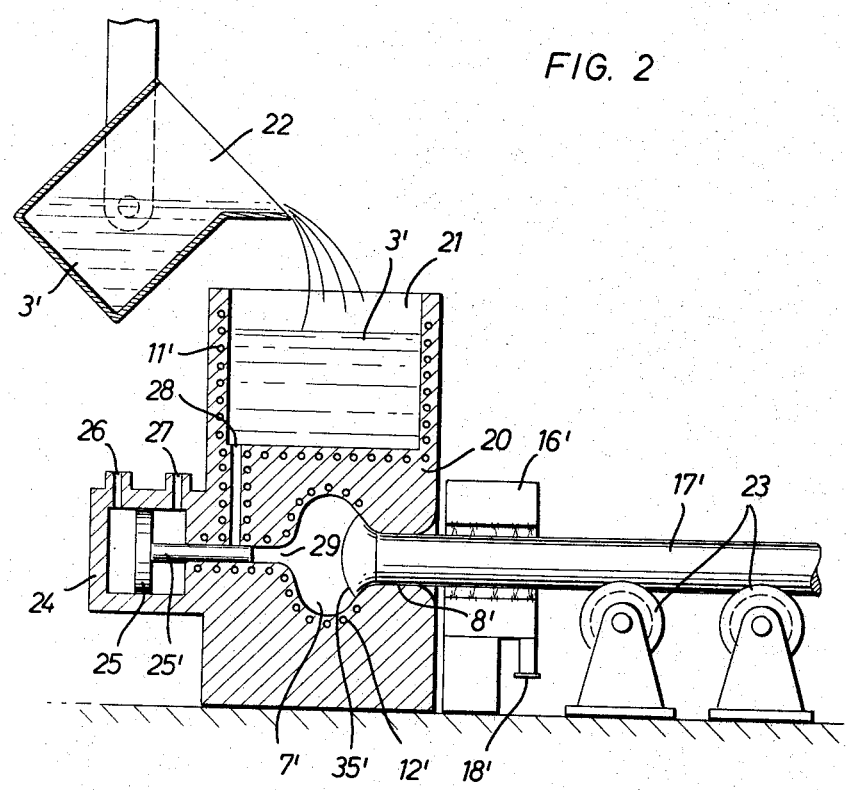
FIGURE 2 shows a vertical section of an apparatus according to a modification of the invention.

According to the modification of the invention, as illustrated in FIGURE 2, the apparatus is not provided with a pressure container such as the container 1 in FIGURE 1, but with a container 20 which forms a chamber 21 which is open at its upper end so that liquid metal 3′ may be filled into it by means of a ladle 22. The bottom of the container 20 is provided with a chamber 7′ which corresponds to the chamber 7 in FIGURE 1 and is connected at one end by two interconnected channels 28 and 29 to the chamber 21 and terminates at its other end into an extrusion nozzle 8′. This apparatus is likewise provided at a point shortly behind the outlet side of the nozzle 8′ with a cooling device 16′ which is supplied with a cooling medium through a conduit 18′ for cooling the extruded material 17′. Since the material 17′ is in this case extruded in a horizontal direction, it is supported by a roller train 23.

The liquid metal 3′ may be heated up or maintained at the desired temperature in the chamber 21 and also in the channels 28 and 29 and in the chamber 7′ by separated heating coils 11′ and 12′ which may be controlled individually. For feeding the liquid metal 3′ from the chamber 21 through the channels 28 and 29 to the chamber 7′ and for also exerting thereon the necessary pressure so as to extrude it from chamber 7′ through the nozzle 8′, the apparatus is further provided with a hydraulically operated piston pump 24, the piston 25 of which may be reciprocated within its cylinder in the horizontal direction by feeding a hydraulic fluid under pressure alternately through one or the other inlet 26 and 27 into one or the other side of the cylinder. Piston 25 carries a piston rod 25′ which is slidable along an extension of the channel 28 and into the latter. Piston rod 25′ is thus adapted to open and close the connection between the two channels 28 and 29 and it permits the liquid metal 3′ not only to flow from chamber 21 into the chamber 7′, but it also forces the metal into this chamber.

Figure 3:
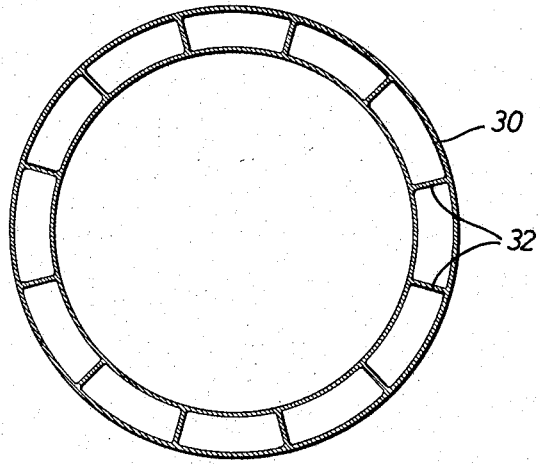
Figure 4:
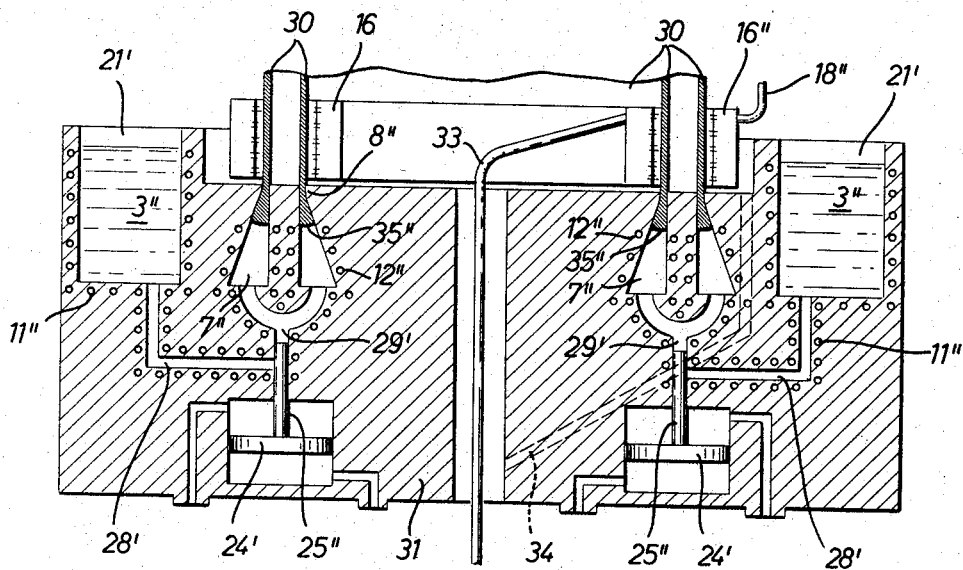
FIGURE 4 shows a vertical section of an apparatus according to another modification of the invention for producing double-walled pipes, for example, of the type as illustrated in FIGURE 3.

In the event that large pipes, and specially pipes 30 with double walls, as shown in FIGURE 3, are to be produced, it is advisable to employ an apparatus as illustrated in FIGURE 4. This apparatus comprises a container 31 which is provided with an annular metal supply chamber 21′ which may be partly or entirely open at its upper side and may be filled through this opening with liquid metal 3″ in the same manner as illustrated in FIGURE 2. The bottom part of this container 31 contains several hydraulically operated reciprocating pumps 24′ similar to the pump 24 in FIGURE 2 and provided with pistons movable within their cylinders and piston rods 25″ connected to these pistons which are adapted to open and close the connecting channels between the annular supply chamber 21′ and the annular chamber 7″ and to force the liquid metal 3″ into this chamber 7″. This apparatus is likewise provided with heating coils 11″ and 12″ or similar heating means for heating up the liquid metal in the metal supply chamber 21′ and for maintaining the metal at the desired temperature in the mentioned connecting channels and in the annular chamber 7″. The extrusion nozzle 8″ is made of a cross-sectional size and shape in accordance with those of the double-walled pipe 30 and its reinforcing or cooling ribs 32 which is to be produced. Similarly as in the other embodiments of the invention as previously described, this apparatus is likewise provided behind the extrusion nozzle 8″ with a cooling device 16″ for cooling the extruded double-walled pipe 30 including its ribs 32. For cooling the extruded pipe more uniformly and effectively, the cooling device 16″ is not only provided with an outer coolant supply line 18″, but also with an inner coolant line 33 so that the pipe 30 will be cooled from the outer and inner sides.

The coolant which may, for example, consist of water, may be discharged through the return line 34 and the central opening in the container 31.

Regarding all three embodiments of the invention, as illustrated in FIGURES 1, 2, and 4, it is of importance that the zone of crystallization of the metal 3, 3', or 3", respectively, is located within the wider part of the extrusion nozzle 8, 8', or 8", that is, at a certain distance from the most constricted part of the nozzle as indicated by the lines 35, 35', or 35", respectively, so that the solid but still malleable metal which is contained within the extrusion nozzle will be compressed during the extrusion process. The amount of metal which is forced during each extrusion process into the chamber 7, 7', or 7", respectively, is only as much as may be required to fulfill the above-mentioned condition.

Of course, a suitable drawgear may also be applied upon the material which is extruded by the apparatus according to FIGURES 2 and 4 in a similar manner as described with reference to FIGURE 1.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A method of extruding materials having a high heat conductivity comprising the steps of filling a chamber of a relatively small capacity with the material in a liquid condition, exerting a pressure upon said liquid material within said chamber so as to extrude the material through an extrusion nozzle at one end of said chamber, cooling the material directly at least immediately when emerging from said nozzle so that the parts of the material located within said nozzle and also within said chamber at the inlet part of said nozzle at a short distance from the most constricted part of said nozzle will be cooled to a solid but malleable condition before being compressed and forced through the nozzle, and further supplying into said chamber only such an amount of liquid material that said parts of said material within said inlet part of said nozzle will be continuously cooled to said solid condition.

2. An apparatus for extruding materials having a high heat conductivity comprising at least one chamber having a relatively small capacity, at least one extrusion nozzle at one end of said chamber, means for supplying said material in a liquid condition into said chamber, means located at least closely adjacent to the outer side of said nozzle for cooling said material at least when emerging from said extrusion nozzle to a temperature so that the parts of the material located within said nozzle and also within said chamber at the inlet part of said nozzle at a short distance from the most constricted part of said nozzle will always be cooled to a solid but malleable condition, and means for exerting on said material within said chamber an extrusion pressure of a sufficient strength to compress said solidified material within said inlet part of said nozzle and to force said material through said nozzle so as to extrude said material from said nozzle.

3. An apparatus as defined in claim 2, in which said means for exerting said extrusion pressure comprise arc producing means within said chamber.

4. An apparatus as defined in claim 2, in which said means for exerting said extrusion pressure comprises at least one pump adapted to supply the required amount of liquid material into said chamber and to extrude said solidified material from said chamber through and from said nozzle.

5. An apparatus as defined in claim 4, in which said pump is a reciprocating piston pump for supplying said liquid material intermittently into said chamber.

6. An apparatus as defined in claim 2, in which said chamber has an annular shape and said extrusion nozzle at one end of said chamber also has an annular shape for producing a seamless tubular element, said cooling means being adapted to cool said material at least as soon as it emerges from said annular nozzle and from the outer and inner sides of said tubular element.

7. An apparatus as defined in claim 6, in which said extrusion nozzle is designed for extruding a seamless tubular element having an outer and inner wall, and reinforcing ribs extending radially between and connecting said walls.

8. An apparatus as defined in claim 6, in which said extrusion nozzle is located above and forms the upper outlet of said annular chamber, said means for exerting said extrusion pressure comprising a plurality of reciprocating piston pumps adapted to supply the required amount of liquid material into said annular chamber from the lower side thereof, so that said tubular element will be extruded in the upward direction from said nozzle.

References Cited
UNITED STATES PATENTS

| | | | |
|---|---|---|---|
| 1,587,933 | 6/1926 | Barme | 72—261 |
| 1,924,294 | 8/1933 | Shirk et al. | 72—270 |

CHARLES W. LANHAM, *Primary Examiner.*

H. DIETER HOINKES, *Assistant Examiner.*